(12) United States Patent
Okada et al.

(10) Patent No.: US 8,454,925 B2
(45) Date of Patent: Jun. 4, 2013

(54) CATHODE ACTIVE MATERIAL FOR NON-AQUEOUS ELECTROLYTE SECONDARY BATTERY AND MANUFACTURING METHOD OF THE SAME

(75) Inventors: Shigeto Okada, Fukuoka-ken (JP); Manabu Nishijima, Fukuoka-ken (JP); Takayuki Doi, Fukuoka-ken (JP); Jun-ichi Yamaki, Fukuoka-ken (JP); Irina D. Gocheva, Fukuoka-ken (JP); Toshiyasu Kiyabu, Nagasaki-ken (JP)

(73) Assignees: Mitsubishi Heavy Industries, Ltd., Tokyo (JP); Kyushu University, National University Corporation, Fukuoka-shi (JP)

(*) Notice: Subject to any disclaimer, the term of this patent is extended or adjusted under 35 U.S.C. 154(b) by 611 days.

(21) Appl. No.: 12/515,212

(22) PCT Filed: Nov. 16, 2007

(86) PCT No.: PCT/JP2007/072289
§ 371 (c)(1), (2), (4) Date: Jul. 22, 2009

(87) PCT Pub. No.: WO2008/059961
PCT Pub. Date: May 22, 2008

(65) Prior Publication Data
US 2010/0035155 A1    Feb. 11, 2010

(30) Foreign Application Priority Data

Nov. 17, 2006 (JP) ................................ 2006-311126
Mar. 28, 2007 (JP) ................................ 2007-083634

(51) Int. Cl.
*H01M 4/58* (2010.01)
*C01G 23/02* (2006.01)
*C01G 45/06* (2006.01)
*C01G 51/08* (2006.01)
*C01G 49/10* (2006.01)
*C01G 53/08* (2006.01)
*C01G 31/04* (2006.01)

(52) U.S. Cl.
USPC ........ 423/466; 423/472; 423/489; 429/218.1; 429/221

(58) Field of Classification Search
USPC ................ 423/466, 472, 489; 429/221, 218.1
See application file for complete search history.

(56) References Cited

U.S. PATENT DOCUMENTS

| 6,428,935 B1 | 8/2002 | Takada et al. |
| 6,974,486 B1 | 12/2005 | Kweon et al. |
| 2004/0121235 A1 | 6/2004 | Amatucci |

FOREIGN PATENT DOCUMENTS

| EP | 1035600 A1 | 9/2000 |
| EP | 1049183 A1 | 11/2000 |

(Continued)

OTHER PUBLICATIONS

Gocheva et al. "Mechanochemical synthesis of NaMF3 (M=Fe,Mn,Ni) and their electrochemical properties as positive electrode materials for sodium batteries". Journal of Power Sources 187 (2009—online Nov. 2008), pp. 247-252.*

(Continued)

*Primary Examiner* — Gregg Cantelmo
(74) *Attorney, Agent, or Firm* — Westerman, Hattori, Daniels & Adrian, LLP

(57) ABSTRACT

In a non-aqueous electrolyte secondary battery, in order to adjust a cathode active material in which guest cation such as Na and Li is included, alkaline metal fluoride which is expressed by a general formula AF and transition metal fluoride which is expressed by a formula M' $F_2$ are subjected to a mechanical milling process to produce metal fluoride compound AM' $F_3$. The mechanical milling process desirably uses a planetary ball mill.

4 Claims, 15 Drawing Sheets

FOREIGN PATENT DOCUMENTS

| | | |
|---|---|---|
| JP | 9-022698 A | 1/1997 |
| JP | 9-22698 A | 1/1997 |
| JP | 9-055201 A | 2/1997 |
| JP | 9-55201 A | 2/1997 |
| JP | 09-55202 A | 2/1997 |
| JP | 11-339800 A | 12/1999 |
| JP | 2000-260433 A | 9/2000 |
| JP | 2001-176510 A | 6/2001 |
| JP | 2004-234977 A | 8/2004 |
| JP | 2005-149946 A | 6/2005 |
| JP | 2005-203249 A | 7/2005 |
| JP | 2006-66081 A | 3/2006 |
| WO | 00/28608 A1 | 5/2000 |

OTHER PUBLICATIONS

S. Pizzini, "Ionic conductivity in lithium compounds", Journal of Applied Electrochemistry, vol. 1, No. 3 (1971), pp. 153-161.*
Korean Office Action dated Feb. 21, 2011, issued in corresponding Korean Patent Application No. 10-2009-7010138.
International Search Report of PCT/JP2007/072289, date of mailing Jan. 29, 2008.
Arai, Hajime et al; "Cathode performance and voltage estimation of metal trihalides"; Journal of Power Sources, vol. 68, 1997, pp. 716-719.
Badway, F. et al.; "Carbon Metal Fluoride Nanocomposites High-Capacity Reversible Metal Fluoride Conversion Materials as Rechargeable Positive Electrodes for Li Batteries"; Journal of the Electrochemical Society, vol. 150, No. 10, 2003, pp. A1318-A1327.
Hoppe, R.; "Zu Grundfragen Anorganischer Festkorperchemie: Sind NaFeF3 [1] und CsFeF3 [2], Perowskite? On fundametal Questions of Inorganic Solid State Chemistry: Are NaFeF3 [1] and CsFeF3 [2] 'Perovskites'?"; Z. Anorg. Allg. Chem., vol. 632, 2006, pp. 593-598.
Japanese Office Action dated May 16, 2012, issued in corresponding Japanese Patent Application No. 2007-083634, (5 pages). With Partial Translation.
Notice of Allowance dated Aug. 20, 2012, issued in corresponding Japanese Patent Application No. 2007-083634, Partial English Translation (3 pages).
Badway et al., "Carbon-Metal Fluride Nanocomposites", Journal of the Electrochemical Society, Jul. 17, 2003, vol. 150, Issue 9, pp. A1209-1218, and cited in Japanese Office Action dated May 16, 2012.
Japanese Office Action dated May 16, 2012, issued in corresponding application No. 2006-311126, with translation.
Japanese Office Action dated Dec. 19, 2012 issued in corresponding application No. 2006-311126, with translation.
Extended European Search Report dated Feb. 22, 2013, issued in corresponding European patent application 07832019.9.
Badway, F. et al., "Next generation positive electrode materials enabled by nanocomposites: Metal Fluorides", Materials Research Society Symposium Proceedings, Materials Research Society, vol. 756, No. 1, P. EE7.1.1-EE7.1.12, Jan. 2003; cited in Extended European Search Report dated Feb. 22, 2013.

* cited by examiner

US 8,454,925 B2

CATHODE ACTIVE MATERIAL FOR NON-AQUEOUS ELECTROLYTE SECONDARY BATTERY AND MANUFACTURING METHOD OF THE SAME

TECHNICAL FIELD

The present invention claims priorities on convention based on Japanese Patent Applications 2006-311126 and 2007-083634. The Disclosures thereof are incorporated herein by reference.

The present invention relates to a non-aqueous electrolyte secondary battery that is possible to be charged and discharged, and more particularly relates to a cathode active material for a non-aqueous electrolyte secondary battery in which characteristics of a non-aqueous electrolyte secondary battery such as an energy density are greatly improved.

BACKGROUND ART

A non-aqueous electrolyte secondary battery is well known which uses an alkali metal ion as an electrolyte ion (a guest cation), especially, a lithium-ion cell using a lithium ion is well known. In a next-generation lithium ion cell used for an electric vehicle battery, olivine phosphate compound represented as $LiMPO_4$ attracts attention as a next-generation cathode active material instead of a transition metal oxide expressed as conventionally-used $LiMO_2$ (M represents a transition element) On the other hand, a carbonaceous material such as graphite is mainly used for an anode.

However, since a phosphate polyanion has a relatively-high molecular weight in the olivine phosphate cathode, a theoretical capacity of the cell (theoretical energy density and a reversible capacity) is limited. For example, the theoretical capacity of $LiFePO_4$ does not exceed 170 mAh/g. When a material which includes anions with a higher electronegativity is used as material of the cathode, the higher energy density can be obtained in theory. The inventors previously proposed the use of a metal fluoride as a cathode active material for a non-aqueous electrolyte secondary battery (Japanese Patent Application Publications JP-A-Heisei 9-22698A and JP-A-Heisei 9-55201). These metal fluorides have a theoretical energy density (the reversible capacity) higher than that of the olivine cathode material such as $LiFeO_4$, and, for example, a $FeF_3/Li$ cell is assumed to have a theoretical energy density as much as approximately 240 mAh/g, according to J. Power Sources, (68, p. 716 1997) by H. Arai, et al.

DISCLOSURE OF INVENTION

In a non-aqueous electrolyte secondary battery using metal fluoride such as $FeF_3$ as a cathode and using carbonaceous material as an anode, the guest cation such as Na and Li needs to be included in the cathode to improve safety and the energy density (the capacity). However, a method of easily preparing such compounds for material of the cathode has not been found.

Accordingly, an object of the present invention is to provide a method of manufacturing a cathode active material for a non-aqueous electrolyte secondary battery, by which the cathode active material including the guest cation such as Na and Li can be utilized in the non-aqueous electrolyte secondary battery.

The inventors succeeded in synthesis of a Na- or Li-containing perovskite-type fluorinated cathode active material by reacting alkali metal fluoride having a specific structure with transition metal fluoride through a mechanochemical reaction, thereby reaching the present invention. That is, one embodiment of the present invention provides a method of manufacturing fluoride AM' $F_3$ and/or AM' $F_4$ ((A indicates Na or Li, and M' represents a transition element) for a cathode active material for a non-aqueous electrolyte secondary battery, wherein the method includes executing a mechanical milling of alkali metal fluoride expressed by a general formula AF (A indicates Na or Li) and transition metal fluoride expressed by a formula M' $F_2$ and/or M' $F_3$ (M' represents a transition element) to produce metal fluoride compound expressed by a general formula AM' $F_3$ and/or AM' $F_4$.

According to the present invention, there are further provided the cathode active material for the non-aqueous electrolyte secondary battery cathode including the fluoride AM' $F_3$ and/or a formula AM' $F_4$ manufactured in the above-mentioned method, the non-aqueous electrolyte secondary battery cathode including the cathode active material, and a non-aqueous electrolyte secondary battery including the cathode; and an anode including a carbonaceous material.

Meanwhile, because the metal fluoride is an ionic compound, the metal fluoride is considered to easily dissolve in a polar solvent included in an electrolytic solution. Accordingly, the metal fluoride has not been practically used as the cathode active material. For this reason, the metal fluoride such as $FeF_3$ is considered to be stably useable to the polar solvent in electrolytic solution only when being coated with carbon (J. Electrochem Soc. (150, A1318 (2003)) by F. Badway et al.).

Another object of the present invention is to provide a new cathode active material for a non-aqueous electrolyte secondary battery utilizing features of metal fluoride.

The inventors found that when the cathode active material is prepared by sufficiently mixing metal fluoride and carbonaceous material, a secondary battery having a high energy density can be obtained, thereby deriving the present invention. That is, another embodiment of the present invention provides a cathode active material of a non-aqueous electrolyte secondary battery, a cathode active material characterized by including the metal fluoride coated with carbon expressed by a general formula $MF_3$ (M indicates a metal element).

BEST MODE FOR CARRYING OUT THE INVENTION

First Embodiment

Figure 1:
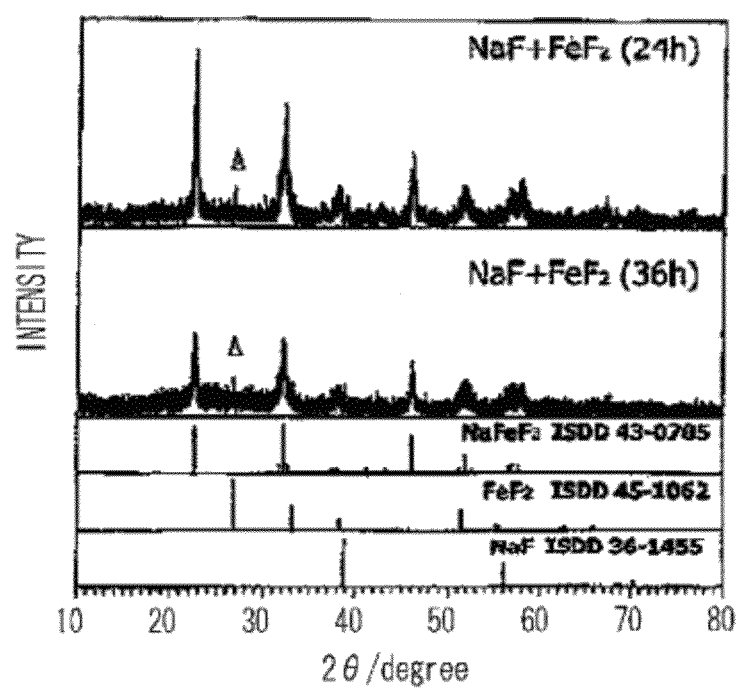
FIG. 1 is an XRD pattern of $NaFeF_3$ manufactured according to a first embodiment of the present invention.

A first embodiment of the present invention will be described by using an example.

In the present embodiment, a perovskite-type fluorine compound AM' $F_3$ and/or AM' $F_4$ is manufactured by executing mechanical milling to an alkali metal expressed by a formula AF (A indicates Na or Li) and transition metal fluoride M' $F_2$ or M' $F_3$ (M' indicates a transition element). This fluoride AM' $F_3$ and/or AM' $F_4$ is used as a cathode active material contained in a cathode of a non-aqueous electrolyte secondary battery. If containing a compound expressed by M' $F_2$ or M' $F_3$ (the transition metal is indicated as M'), the transition metal fluoride can be employed. In view of using as the cathode active material for the non-aqueous electrolyte secondary battery, it is preferable that the transition metal fluoride includes fluoride of at least one transition element M' which is selected from the group consisting of V, Ti, Fe, Ni, Co, and Mn. That is, it is preferable that the transition metal fluoride is selected from the group consisting of $VF_3$, $TiF_3$, $FeF_2$, $NiF_2$, $CoF_2$, and $MnF_2$.

In the following description, a case that AM' $F_3$ of the fluoride AM' $F_3$ and/or AM' $F_4$ is produced will be described as an example. The mechanical milling applied in the present embodiment is a process of a physically pulverizing raw material by applying mechanical force to the raw material, making the pulverized raw material be mechanically diffused, and promoting a chemical reaction. The mechanical milling process is carried out at room temperature. In the present embodiment, it can be considered that the metal fluoride compound AM' $F_3$ for the cathode active material of the non-aqueous electrolyte secondary battery is produced through the following reaction:

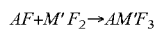

$$AF + M'F_2 \rightarrow AM'F_3$$

A specific method applied to the mechanical milling process is not especially limited, and various methods conventionally used for pulverizing and mixing solid substance can be applied to the process. Preferably, the mechanical milling process is a ball milling technique, and the most preferably, is a planetary ball milling technique. The planetary ball milling includes a revolving mill body and a rotating mill pot. Substance to be processed is put into the rotating mill pot with a pulverizing medium (generally small-diameter balls). The pulverizing medium is driven by a centrifugal force generated in the rotation and revolution, and the substance to be processed is pulverized and mixed. As described above, it is especially preferable to employ the planetary ball milling because the material can be sufficiently pulverized and mixed due to the pulverization by the rotation and revolution. In the present embodiment, the mechanical milling process is carried out as a dry process under an inert gas atmosphere such as argon gas. Based on a result of analyzing and confirming products by using XRD (X-ray diffraction), conditions of the mechanical milling process (for example, a process time, a speed of the pulverizing and mixing) may be determined so that impurities (including a remaining material) can be reduced as much as possible and crystal powder of objective fluoride AM' $F_3$ can be obtained as much as possible. Here, it should be noted that the excessive mechanical milling process (for example, an excessively long process time) is rather undesirable to produce the crystal powder of fluoride AM' $F_3$. As one example, conditions that a process time is approximately 20 to 30 hours and the rotation speed of the mill pot is approximately 150 to 250 rpm are employed in case of using the planetary ball milling.

In case of using the fluoride AM' $F_3$ as the cathode active material, it is desirable to further carry out the carbon coating. The carbon coating is carried out by mechanically mixing the fluoride AM' $F_3$ and a carbonaceous material. It is preferable to use the ball milling in the mechanical mixing. Moreover, it is particularly desirable to use the planetary ball milling. When the planetary ball milling is used, metal fluoride M' $F_3$ and the carbonaceous material as raw materials can be sufficiently pulverized and mixed due to pulverization energy of the rotation and revolution.

A mixing time is more than 4 hours and generally 20 to 30 hours, however, a short mixing time (for example, 4 hours) is desirable in some cases, depending on a combination of the cathode active material and the carbonaceous material. The mixing is carried out in a dry process under an inert gas atmosphere such as argon gas.

(Electrode and Cell)

In the present embodiment, a cathode active material of a secondary battery (non-aqueous electrolyte secondary battery) including the fluoride AM' $F_3$ obtained by the above-mentioned method, the secondary battery cathode including the cathode active material, and non-aqueous electrolyte secondary battery is provided in which an anode and the cathode are combined.

In the present embodiment, the cathode is manufactured by mixing powder of the fluoride AM' $F_3$ with binder as needed and further with an electrically conductive material as needed and then by forming the obtained mixed powder on a support made of stainless steel or the like in a pressure bonding manner or filling the powder in a metal container. Alternatively, the cathode can be obtained by mixing the mixed powder of the fluoride AM' $F_3$ with organic solvent and applying the obtained slurry on a plate of metal such as aluminum, nickel, stainless, and copper. As the binder, at least one type of material is selected from a group consisting of polytetrafluoroethylener polyvinylidene-fluoride, polyvinylchloride, ethylene-propylene-diene polymer, styrene-butadiene rubber, acrylonitrile-butadiene rubber, fluoro-rubber, polyvinyl acetate, polymethylmethacrylate, polyethylene, and cellulose nitrate. In addition, as the conductive material, at least one type of material is selected from a group consisting of acetylene black, carbon, graphite, natural black lead, artificial black lead, and needle coke. Moreover, as the organic solvent, at least one type of organic solvent is selected from a group consisting of N-methylpyrrolidone, toluene, cyclohexane, dimethylformamide, dimethylacetamider methyl ethyl ketone, methyl acetate, methyl acrylate, diethyltriamine, N-N-dimethylaminopropylamine, ethylene oxide, and tetrahydrofuran.

In the non-aqueous electrolyte secondary battery according to the present embodiment, the anode used in combination with the above-mentioned cathode can employ sodium, lithium, compounds of these alkali metals, alloys of these alkali metals, and the carbonaceous material as an anode active material. However, in the present embodiment, it is a significant point that the carbonaceous material can be used as the anode active material. As the carbonaceous material used for the anode active material, a carbon body of graphite (black lead) is preferable, and additionally hard carbon obtained by burning various types of polymers can be used. However, the material is not limited to them. In addition, two or more types of these carbonaceous materials may be mixed to be used.

The manufacturing method of the anode can be realized in accordance with a well-known method, and the anode can be manufactured in the same manner as the method described in relation to the cathode. That is, the manufacturing of the anode can be realized, by mixing powder of the anode active material with the above-mentioned binder as needed and further with the above-mentioned conducting material as needed, and then by forming this mixed powder to be a sheet and pressing this sheet to a conductive net (a power collector) made of stainless steel and copper in a pressure bonding manner. In addition, the anode can be manufactured by mixing the powder for the anode active material with the above-mentioned organic solvent and applying the obtained slurry on a metal plate such as copper.

As other components in the non-aqueous electrolyte secondary battery, those used in a well-known non-aqueous electrolyte secondary battery can be used. As the other components, the followings are shown as an example.

An electrolytic solution usually includes an electrolyte and a solvent. The solvent of the electrolytic solution is not specifically limited to non-aqueous solvent, and at least one of solvents is selected from the group consisting of carbonates, ethers, ketones, sulfolane compounds, lactones, nitlyls, chlorinated hydrocarbons, amines, esters, amides, and phosphoester compounds. To be more specific, as the solvent, at least one of solvents is selected from the group consisting of 1-, 2-dimethoxyethane, 1,2-ethoxyethane, tetrahydrofuran, 2-methyltetrahydrofuran, ethylene carbonate, vinylene carbonate, methyl formate, dimethylsulfoxide, propylene carbonate, acetonitrile, γ-butyllactone, dimethylformamide, dimethylcarbonate, diethylcarbonate, sulfolane, ethyl methyl carbonate, 1,4-dioxane, 4-methyl-2-pentanone, 1,3-dioxolan, 4-methyl-1,3-dioxolan, diethyl ether, sulfolane, methyl sulfolane, propionitrile, benzonitrile, butyronitrile, valeronitrile, 1,2-dichloroethane, trimethyl phosphate, and triethyl phosphate. In addition, imidazolium or quaternary ammonium ionic liquid with high oxidation resistance also can be used as the solvent.

As the electrolyte, material able to give an alkali metal ion used for an electrochemical reaction between the cathode active material and the anode active material can be used. Specifically, at least one electrolyte material is selected from the group consisting of $LiClO_4$, $LiPF_6$, $LiBF_4$, $LiCF_3SO_3$, $LiAsF_6$, $LiB(C_6H_5)_4$, $LiCl$, $LiBr$, $CH_3SO_3Li$, $CF_3SO_3Li$, $LiN(SO_2CF_3)$, $LiN(SO_2C_2F_5)_2$, $LiC(SO_2CF_3)_3$, and $LiN(SO_3CF_3)_2$. In addition, a well-known solid electrolyte such as $LiTi_2(PO_4)_3$ having a NASICON-structure also can be used as the electrolyte.

In the non-aqueous electrolyte secondary battery of the present embodiment, various types of well-known material can be used for cell components such as a separator, a cell case, and components, and are not specifically limited. The non-aqueous electrolyte secondary battery of the present embodiment can be assembled by using the above-mentioned cell components in accordance with a well-known method. In this case, a shape and a size of the cell are not specifically limited. For example, various types of shapes such as a cylindrical shape, a square shape, and a coin shape and sizes of them can be appropriately employed.

Additionally, in the above-described, a case where $AM'F_3$ of the fluoride $AM'F_3$ and/or $AM'F_4$ is generated has been described as an example. $AM'F_4$ can be generated by replacing the transition metal fluoride $M'F_2$ by $M'F_3$, and can attain the same effect as that of the $AMF_3$ when used as the cathode active material.

Examples will be described below to show features of the present invention more specifically, although the present invention is not limited to the following examples.

EXAMPLE 1

Preparation of Cathode Active Material
(Na-Containing Perovskite-Type Fluorine Compound $AM'F_3$)

Using equimolar mixture of sodium fluoride (NaF) and transition metal fluoride $M'F_2$ (M' is any one of Fe, Ni, and Mn) as materials, the mechanical milling process was carried out by using the planetary ball milling. Purity of both the materials were 99%, and materials manufactured by Wako Pure Chemical Industries, Ltd. or Soekawa Chemical Co., Ltd. were used. As the planetary ball milling, an experimental planetary tumbling pot mill LP-4/2 (manufactured by Ito seisakusho Co., Ltd.) was used. Two, four, and fifteen balls having diameters 20 mm, 15 mm, and 10 mm respectively are put into a mill pot of 80 ml, and balls having a diameter 3 mm were further put into the mill pot to be 175 g in total. Additionally, the material was put into the mill pot, and the mill pot was rotated at a rotation speed 200 rpm. A process time was 24 hours or 36 hours.

An XRD pattern ($CuK_\alpha$) of a product obtained by using NaF and $FeF_2$ as the materials is shown in FIG. 1. In FIG. 1, the pattern of the product obtained by a process for 24 hours is shown by $NaF+FeF_2$ (24 h). In addition, a pattern of the product obtained by the process for 36 hours is shown by $NaF+FeF_2$ (36 h). Moreover, in FIG. 1, well-known patterns of $NaFeF_3$, $FeF_2$, and NaF are also shown to identify the product. As shown in FIG. 1, the product in 24 hours and the product in 36 hours both well fit the pattern of $NaFeF_3$ and preparation of $NaFeF_3$ is shown. Furthermore, as shown in FIG. 1, it was found that in the milling process for 24 hours and the milling process for 36 hours, the former has less impurity (remaining materials) and obtains the product with high crystallinity.

Figure 2:
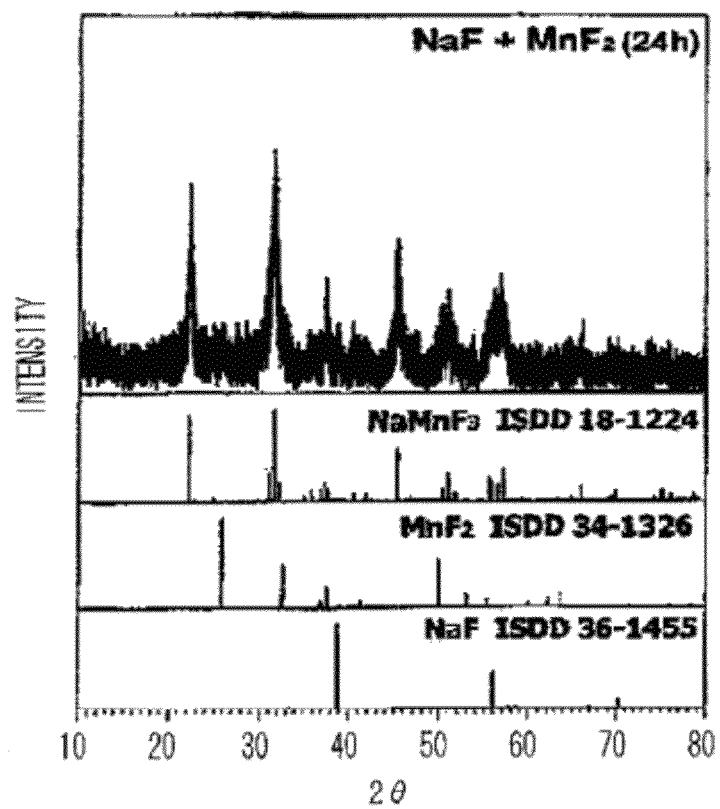
FIG. 2 is an XRD pattern of $NaMnF_3$ manufactured according to the first embodiment.

An XRD pattern ($CuK_\alpha$) of a product obtained by using NaF and $MnF_2$ as the materials is shown in FIG. 2. In a similar manner to FIG. 1, well-known patterns of $NaMnF_3$, $MnF_2$, and NaF are also shown. As shown in FIG. 2, preparation of $NaMnF_3$ is shown.

Figure 3:
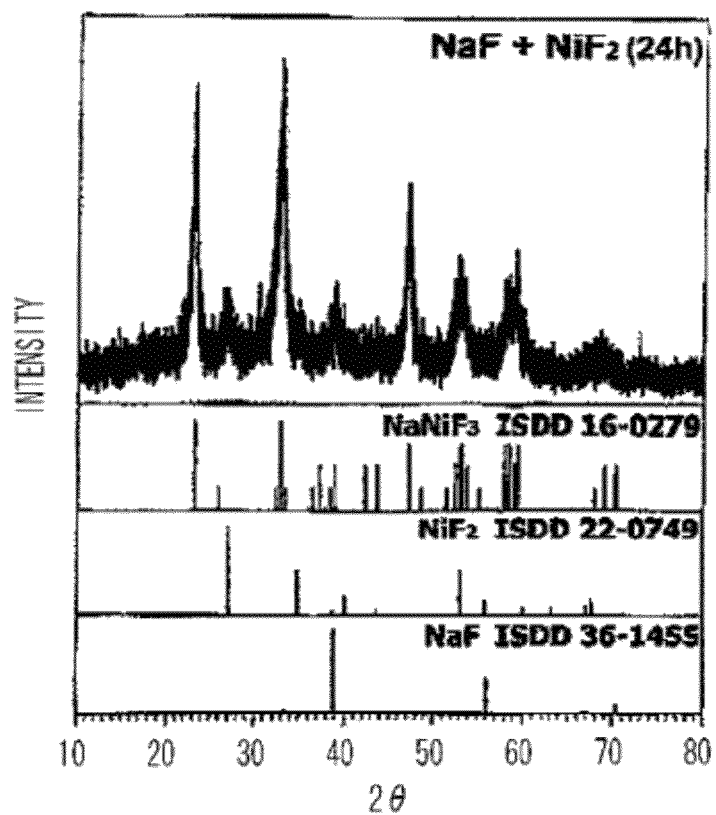
FIG. 3 is an XRD pattern of $NaNiF_3$ manufactured according to the first embodiment.

An XRD pattern ($CuK_\alpha$) of a product obtained by using NaF and $NiF_2$ as the materials is shown in FIG. 3. In a similar manner to FIGS. 1 and 2, well-known patterns of $NaNiF_3$, $NiF_2$, and NaF are also shown. As shown in FIG. 2, preparation of $NaNiF_3$ is shown.

Meanwhile, in FIGS. 1 to 3, respective identification patterns of $NaFeF_3$, $NaMnF_2$, and $NaNiF_3$ are patterns of a space group Pnma having orthorhombic crystal in which a unit of a perovskite structure is slightly distorted (RZ. Annorg. Allg. Chem. (632, 593 2006) by Hoppe et al.). That is, the product obtained in the present embodiment is identified as the space group Pnma having orthorhombic crystal where a unit of perovskite structure is slightly distorted.

EXAMPLE 2

Measurement of Cell Characteristics

Characteristics of the non-aqueous electrolyte secondary battery employing the $NaFeF_3$ synthesized in example 1 as the cathode active material were evaluated.

Figure 4:
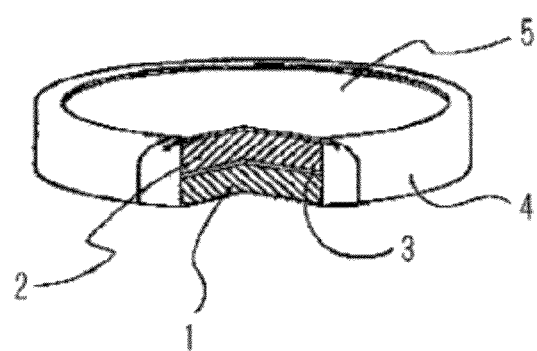
FIG. 4 is a structural cross-section view showing a structure of a non-aqueous electrolyte secondary battery used for measurement of cell characteristics in the present invention.

FIG. 4 is a schematic view showing a configuration of an assembled non-aqueous electrolyte secondary battery. This non-aqueous electrolyte secondary battery includes a cathode 1, an anode 2, a cathode container 4, an anode lid 5, and a separator and electrolytic solution 3 (separator in which the electrolytic solution 3 is impregnated). The cathode 1 and the anode 2 were inserted into the cathode container 4, and the separator was put between the cathode 1 and the anode 2.

To manufacture the cathode 1, the cathode active material manufactured in example 1, an electrically conductive material (acetylene black), and binder (PTFE) were mixed at the ratio of 70:25:5 by weight, and thus a pellet was manufactured. The carbon coating was further carried out to improve conductivity, thereby obtaining the cathode 1.

Metallic sodium was used as the anode. 1M $NaClO_4$/PC was used as the electrolytic solution. Polypropylene was used as the separator.

Figure 5:
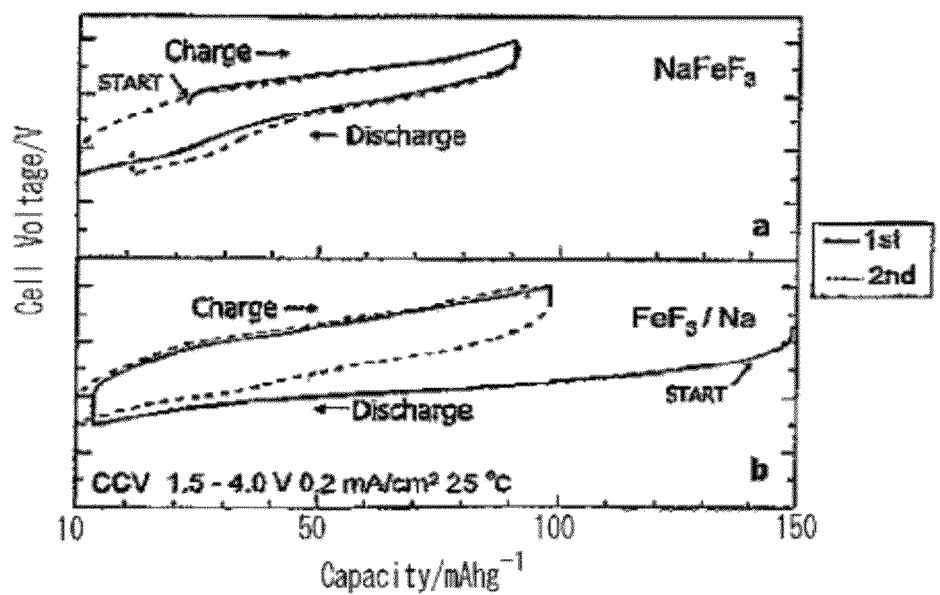
FIG. 5 shows charge and discharge profiles of a battery employing $NaFeF_3$ manufactured according to the first embodiment as a cathode active material.

Measurement of charging and discharging of the non-aqueous electrolyte secondary battery manufactured in the above-mentioned manner was carried out (by using BTS-2004 manufactured by NAGANO Co., Ltd.). The measurement was carried out by CCV measurement under measurement conditions that the temperature was 25° C., a current density was 0.2 $mA/cm^2$, and a voltage range was 1.5 to 4.0 V. A measurement result is shown in upper half of FIG. 5. In FIG. 5, a solid line indicates a result of a first cycle and a dashed line indicates a result of a second cycle.

For comparison, a non-aqueous electrolyte secondary battery ($FeF_2$/Na) employing $FeF_3$ not including Na as the cathode active material was manufactured, and the measurement of charging and discharging of the cell was carried out under the same conditions. A result of $FeF_3$/Na is shown in lower half of FIG. 5.

The non-aqueous electrolyte secondary battery employing $NaFeF_3$ as the cathode active material has an initial discharged capacity or approximately 90 mAh/g at least. Profiles of charging and discharging in the second cycle well fit those of a cell employing $FeF_3$ as the cathode active material. Accordingly, it can be understood that Na in the cathode active material synthesized through the mechanical milling in accordance with the present embodiment does not loose its electrochemical activity. That is, it can be understood that the cathode active material of the present embodiment can be applied to a cathode active material of the non-aqueous electrolyte secondary battery.

Second Embodiment

Next, a second embodiment will be explained. A cathode active material for non-aqueous electrolyte secondary battery of the present embodiment includes a metal fluoride $XF_3$ coated with carbon. The fluoride $AM'F_3$ (that is, X=AM') shown in the first embodiment and fluoride (hereinafter to be referred to as $MF_3$) of a trivalent metal (hereinafter to be referred to as M) are shown as the metal fluoride $MF_3$.

In the present embodiment, a case of using the fluoride of trivalent metal $MF_3$ is exemplified and described.

In the metal fluoride $MF_3$, any trivalent metal can be applied to the metal element indicated by M. For example, Fe (iron), V (vanadium), Ti (titanium), Co (cobalt), and Mn (manganese) are shown as the trivalent metal indicated by M. For example, $FeF_3$, $VF_3$, $TiF_3$, $CoF_3$, and $MnF_3$ are shown as the metal fluoride coated with carbon.

This metal fluoride $MF_3$ coated with carbon is used as the cathode active material included in a cathode of the non-aqueous electrolyte secondary battery. An alkali metal or an alkali metal compound is shown as an anode active material of an anode of the non-aqueous electrolyte secondary battery. It is preferable that lithium (Li) or sodium (Na) is used as the anode active material. The non-aqueous electrolyte secondary battery where the metal fluoride $MF_3$ coated with carbon is used as the cathode active material and Li is used as the anode active material shows reversible charge and discharge characteristics of a large capacity. In addition, in case of using not Li but Na as the anode active material, the reversible charge and discharge characteristics are shown in the same manner.

For example, when the $FeF_3$ coated with carbon is used as the cathode active material, a reversible capacity (energy density) of 200 mAh/g or more is realized. In addition, in a sodium cell inexpensive more than a lithium cell, when the metal fluoride $MF_3$ coated with carbon is used as the cathode active material, a reversible charging and discharging reaction with a high energy density is obtained (refer to examples described later).

In the present embodiment, $VF_3$ is a particularly preferable compound as the metal fluoride $MF_3$. In the lithium secondary battery employing $VF_3$ coated with carbon as the cathode active material, there is almost no difference between charge characteristics and discharge characteristics. In addition, this lithium secondary battery is extremely efficient, and has a high energy density more than 200 mAh/g (refer to embodiments described later).

For example, $TiF_3$, $CoF_3$, and $MnF_3$ are exemplified as the metal fluoride $MF_3$ other than $VF_3$. Also, in the lithium cell employing $TiF_3$, $CoF_2$, and $MnF_3$ coated with carbon as the cathode active material, the cell has the reversible charge and discharge characteristics and a high energy density. Similarly, in the sodium cell employing $TiF_3$, $CoF_3$, and $MnF_3$ coated with carbon as the cathode active material, the cell has the reversible charge and discharge characteristics and the high energy density.

The metal fluoride $XF_3$ coated with carbon in the present embodiment is manufactured by mechanically mixing metal fluoride reagent (manufactured by Soekawa Chemical Co., Ltd) and a carbonaceous material as materials under an inert gas atmosphere. The metal fluoride reagent and the carbonaceous material are mixed in a dry process.

In mechanically mixing the metal fluoride reagent and the carbonaceous material as the materials, it is preferable to use the ball mill. In addition, it is especially preferable to employ the planetary ball milling. When using the planetary ball milling, the metal fluoride $MF_3$ and the carbonaceous material as the materials can be sufficiently pulverized and mixed by the pulverization energy due to the rotation and revolution motions.

The mixing time is 4 hours or more and generally 20 to 30 hours, however, short mixing time (for example, 4 hours) is desirable in some cases depending on a combination of the cathode active material and the carbonaceous material. The mixing is carried out in the dry process under the inert gas atmosphere such as argon gas.

Any conductive carbon-based substance can be applied as the carbonaceous material mixed with the metal fluoride $MF_3$. For example, acetylene black, carbon black, and activated carbon are exemplified as the carbonaceous material. A mixing ratio of the metal fluoride $MF_3$ and the carbonaceous material (metal fluoride $MF_3$: the carbonaceous material) is optimally in a range from 50:50 to 90:10 by weight, and is further optimally at 70:25. When a contained amount of the metal fluoride $MF_3$ is 50% or less than that of the carbonaceous material, an electro-chemical reaction between an electrolyte and the cathode active material does not sufficiently proceed, so that a high reversible capacity can be attained. On the other hand, when the contained amount of the metal fluoride $MF_3$ is more than 90% of that of the carbonaceous material, the carbon coating becomes incomplete, so that the cathode active material is easily eluted into the electrolyte.

As described above, the metal fluoride $MF_3$ is reduced in particles by mechanically pulverizing and mixing the metal fluoride $MF_3$ and the carbonaceous material, the surface of the metal fluoride $MF_3$ particle is evenly coated with carbon. This was confirmed through an observation using SEM (Scanning Electron Microscopy) and EDS (Energy dispersive X-ray spectroscopy).

Since the surface of the metal fluoride $MF_3$ particle is uniformly coated with carbon, electric conductivity is given to the above-described cathode active material. In addition, the elution of the metal fluoride $MF_3$ to the non-aqueous electrolytic solution is suppressed by the carbon coating. As the result, the non-aqueous electrolyte secondary battery having an extremely-high reversible capacity (energy density) can be obtained.

To further specifically show the features of the present invention, examples of measurement of charging and discharging carried out to the lithium cell (Li cell) employing various types of metal fluoride $MF_3$ coated with carbon as the cathode active material and to the lithium cell (Li cell) and sodium cell (Na cell) employing various types of metal fluoride $MF_3$ coated with carbon as the cathode active material will be described below.

EXAMPLE 3

Preparation of Metal Fluoride $MF_3$ Coated with Carbon

Using the planetary ball mill (manufactured by Ito seisakusho Co., Ltd., LA-PO4), metal fluoride $FeF_3$ and acetylene black (carbonaceous material) were mixed for a predetermined time. In this manner, the metal fluoride $FeF_3$ coated with carbon was obtained as a cathode active material. The number of revolutions of the planetary ball mill was 200 rpm. In addition, the mixing was carried out under an Ar atmosphere. A mixing ratio (metal fluoride $FeF_3$: acetylene black: PTFE) was 70:25:5. The acetylene black manufactured by DENKI KAGAKU KOGYO KABUSHIKI KAISYA was used. The PTFE manufactured by DAIKIN INDUSTRIES, ltd. was used. The obtained metal fluoride $FeF_3$ coated with carbon will be described below as a carbon-coated $FeF_3$.

Using the $VF_3$ as the metal fluoride $MF_3$, the $VF_3$ coated with carbon (hereinafter referred to as a carbon-coated $VF_3$) was obtained. Other than a point of using $VF_3$ as the metal fluoride $MF_3$, the same manufacturing conditions as that of the carbon-coated $FeF_3$ were employed.

Using the $TiF_3$ as the metal fluoride $MF_3$, the $TiF_3$ coated with carbon (hereinafter referred to as a carbon-coated $TiF_3$) was obtained. Other than a point of using $TiF_3$ as the metal fluoride $MF_3$, the same manufacturing conditions as that of the carbon-coated $FeF_3$ were employed.

Structure and Assembly of Non-Aqueous Electrolyte Cell

Next, a non-aqueous electrolyte secondary battery was assembled. Two types of cells, a Li cell and a Na cell, were manufactured as the non-aqueous electrolyte secondary batteries. The non-aqueous electrolyte secondary battery is a coin-shaped non-aqueous electrolyte secondary battery shown in FIG. 4.

As the cathode 1, the carbon-coated $FeF_3$, the carbon-coated $VF_3$, and the carbon-coated $TiF_3$ manufactured in example 3 were used. The cathode 1 was coin-shaped with the diameter of 1.0 cm.

In case of the Li cell, a Li metal (manufactured by HONJO METAL CO., LTD.) was used as the anode 2. The anode 2 was coin-shaped with the diameter of 1.5 cm. In addition, 1M $LiPF_6$/EC:DMC (1:1 vol %) (manufactured by Tomiyama Pure Chemical Industries, Limited.) was used as electrolytic solution 3. Microporous polypropylene (CELGARD K.K.) was used as the separator.

In case of the Na cell, a Na metal (manufactured by AlDRICH K.K.) was used as the anode 2. In addition, 1M $NAClO_4$/PC (manufactured by Tomiyama Pure Chemical Industries, Limited.) was used as electrolytic solution 3. Conditions other than these points were the same as those of the Li cell.

Measurement of Charging and Discharging

Subsequently, measurement of charging and discharging characteristics was carried out to each of the manufactured Li cells and Na cells. An apparatus used for the measurement was NAGANO BTS-2004 (manufactured by NAGANO Co., Ltd.). The measurement temperature was 25° C., voltage ranges were 2.0 to 4.5V (Li cell) and 1.5 to 4.0V (Na cell), and a current density was 0.2 mA/cm$^2$ in principle. Two cycles of the charging and discharging were carried out.

EXAMPLE 4

Carbon-Coated $FeF_3$

Figure 6:
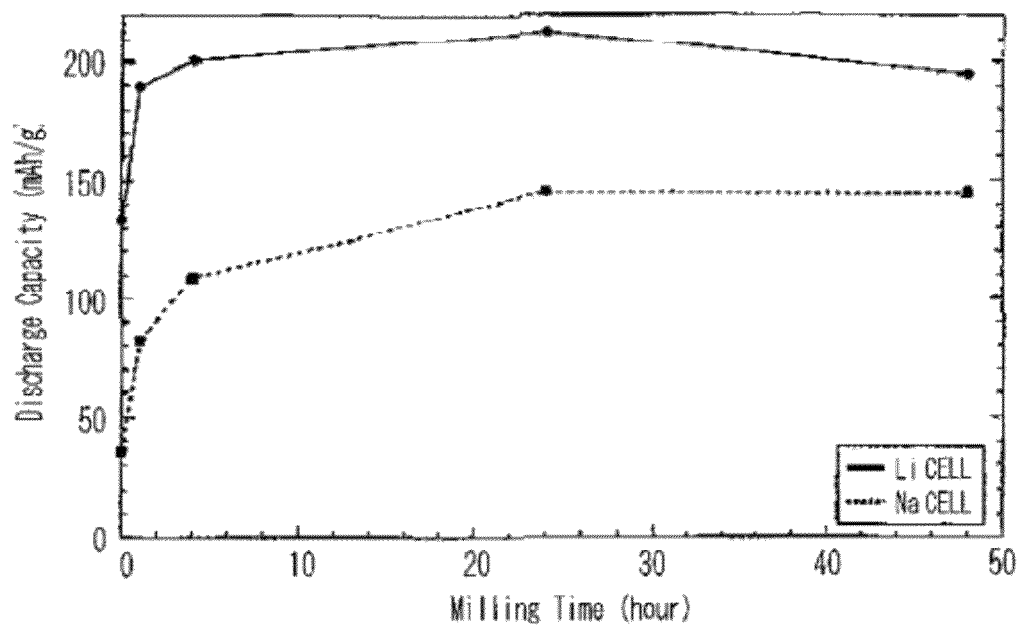
FIG. 6 is a graph showing a relationship between a ball milling time and a discharge capacity in a non-aqueous electrolyte secondary battery according to a second embodiment of the present invention.

FIG. 5 is a graph showing a relationship between the mixing time of the planetary ball milling and a discharge capacity of the non-aqueous electrolyte secondary battery. In a graph shown in FIG. 6, a result of the Li cell employing the carbon-coated $FeF_3$ as the cathode 1 (a solid line in the drawing) and a result of the Na cell employing the carbon-coated $FeF_3$ as the cathode 1 (a dashed line in the drawing) are shown. For reference, a result of a case (manual mix) where the $FeF_3$ and the carbonaceous material were manually mixed is additionally shown. As shown in FIG. 2, in case of using the carbon-coated $FeF_3$, it can be understood that an excellent discharge capacity can be obtained in both of the Li cell and the Na cell under a condition that the mixing time is 4 hours or more and approximately 10 hours or more in particular.

Figure 7A:
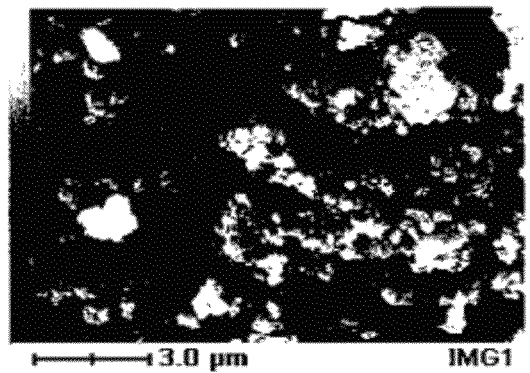
FIG. 7A is an SEM image of a specimen used as the cathode active material of the second embodiment.
Figure 7B:
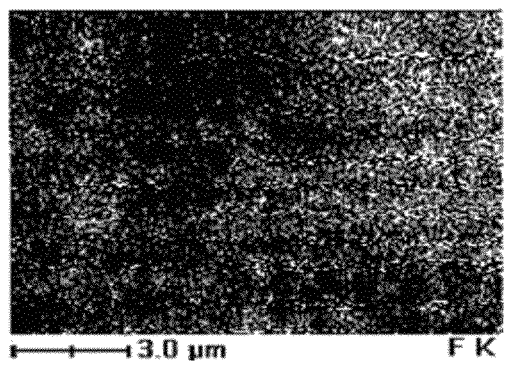
FIG. 7B is an EDS image of fluorine in the cathode active material of the second embodiment.
Figure 7C:
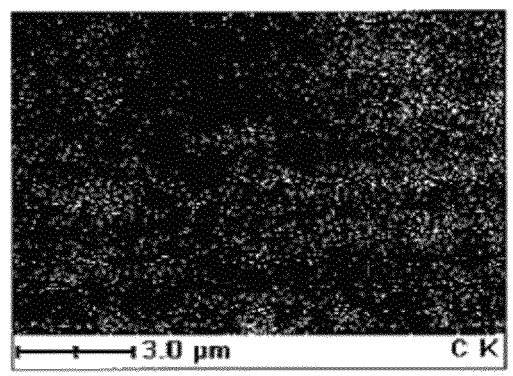
FIG. 7C is an EDS image of carbon in the cathode active material of the second embodiment.

FIGS. 7A to 7C show an SEM image or an EDS image of the obtained carbon-coated $FeF_3$ mixed by the planetary ball milling for 24 hours, respectively. FIG. 7A shows a SEM image, FIG. 7B shows an EDS image of F (fluorine), and FIG. 7C shows an EDS image of C (carbon). The EDS image of F and the EDS image of C well correspond to the SEM image, and it is shown that a surface of the $FeF_3$ to be the cathode 1 is uniformly coated with carbon.

Figure 8:
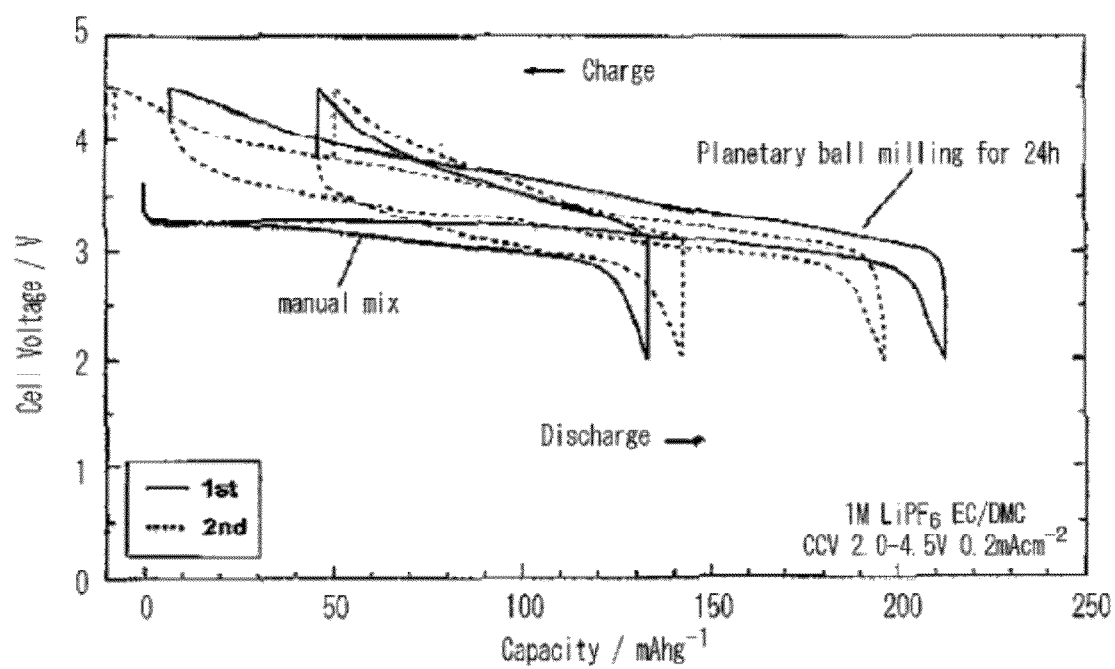
FIG. 8 is graphs showing charge and discharge profiles of a Li cell employing the cathode active material of the second embodiment.

FIG. 8 shows profiles of charging and discharging of the Li cell (lithium cell) employing the carbon-coated $FeF_3$ as the cathode active material. In FIG. 8, a result regarding the cathode active material manufactured by mixing for 24 hours using the planetary ball milling (planetary ball milling for 24 h) is shown. For comparison, a result regarding the case of manual mix is additionally shown. In FIG. 8, a solid line represents a result of a first cycle and a dashed line represents a result of a second cycle. It can be understood that while a capacity of the manufactured Li cell was less than 150 mAh/g in case of manual mix, a reversible capacity of 200 mAh/g or more can be obtained in the Li cell employing the carbon-coated $FeF_3$ as the cathode 1 due to the planetary ball milling.

Figure 9:
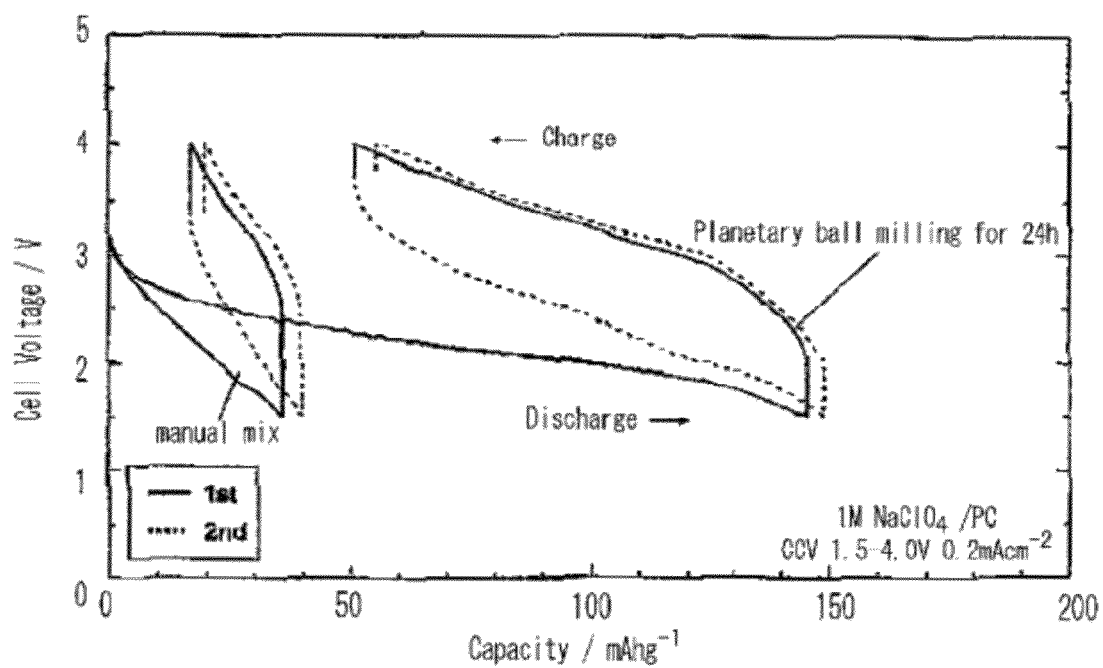
FIG. 9 is graphs showing charge and discharge profiles of a Na cell employing the cathode active material according to the second embodiment.

FIG. 9 shows profiles of charging and discharging of the Na cell (sodium cell) employing the carbon-coated $FeF_3$ as the cathode active material. Similar to FIG. 8, a result regarding the carbon-coated $FeF_3$ manufactured by mixing for 24 hours using the planetary ball milling (planetary ball milling for 24 h) and a result of the case of manually mixing (manual mix) are shown. In FIG. 9, a solid line represents a result of a first cycle and a dashed line represents a result of a second cycle. It can be understood that while a capacity of the manufactured Li cell was less than 40 mAh/g in case of the manual mix, a reversible capacity of approximately 150 mAh/g or more can be obtained in the Li cell employing the carbon-coated $FeF_3$ as the cathode 1. It can be understood that a high reversible capacity can be obtained by using the carbon-coated $FeF_3$ not only in the Li cell but also in the Na cell employing inexpensive Na as an anode.

Figure 10:
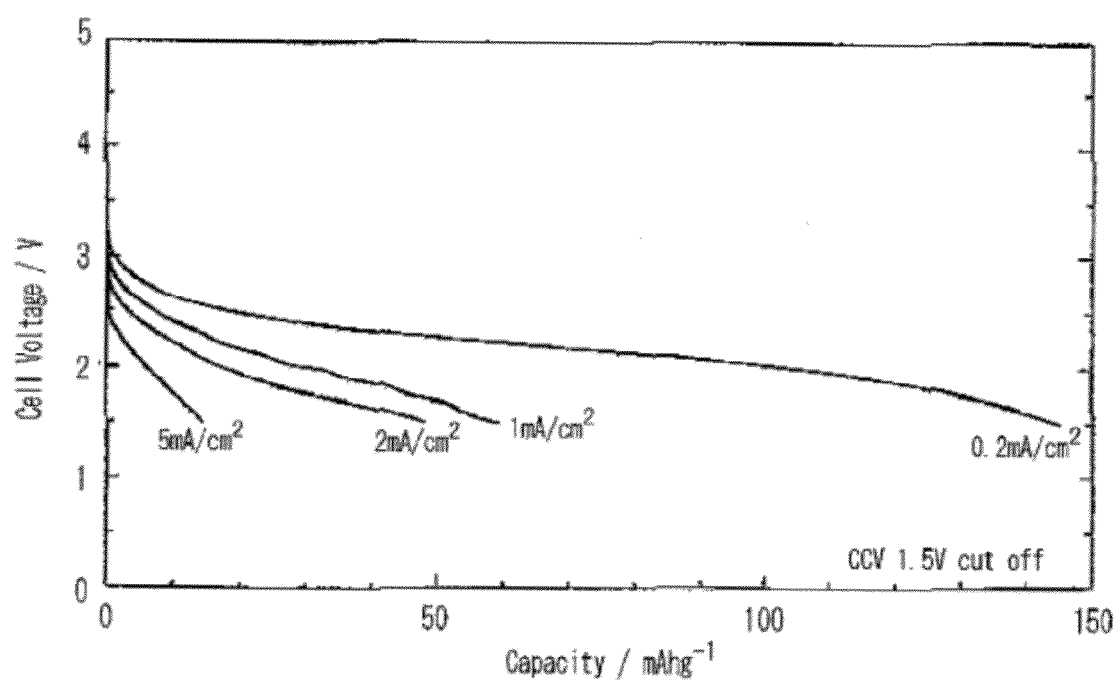
FIG. 10 is graphs showing a rate characteristic of the Na cell employing the cathode active material of the second embodiment.

FIG. 10 shows a rate characteristic of the Na cell employing the carbon-coated $FeF_3$ as the cathode 1. In FIG. 10, results when current values in charging and discharging are 0.2 mA/cm², 1 mA/cm², 2 mA/cm², and 5 mA/cm² are shown, respectively. For example, when the current value is 0.2 mA/cm², the cell voltage is stable approximately between 2.0 and 2.5 (V) in a region in which the capacity is between approximately 20 mAh/g and approximately 120 mAh/g. As described above, there is a region in which a stable voltage is realized with keeping a high reversible capacity.

Figure 11:
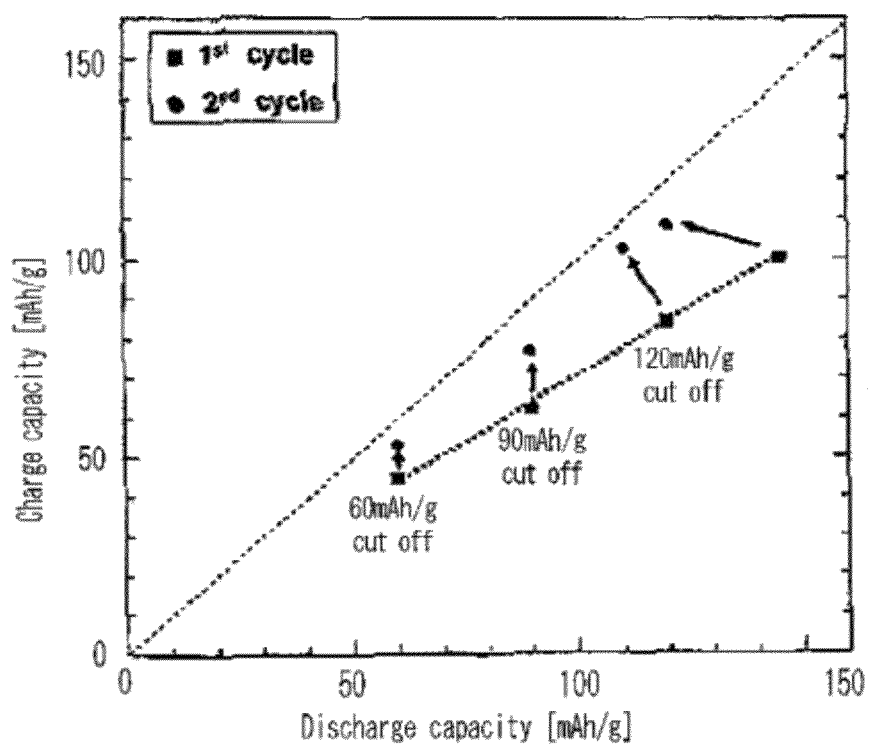
FIG. 11 is graphs showing dependency of depth of discharge of the Na cell employing the cathode active material of the second embodiment.

FIG. 11 shows dependency of depth of discharge of the Na cell employing the carbon-coated $FeF_3$ as the cathode 1. A horizontal axis represents a discharge capacity and a vertical axis represents a charge capacity. In addition, a dashed line in the drawing represents a line where the discharge capacity is equal to the charge capacity. When a current value is 60 mAh/g, a ratio between the discharge capacity and the charge capacity in the second cycle is closer to a line when the discharge capacity is equal to the charge capacity than that of the first cycle. Also, when current values are 90 and 120 mAh/g, a similar tendency was shown. That is, it can be understood that charge and discharge efficiencies are improved as the charge and discharge cycles are repeated.

EXAMPLE 5

Carbon-Coated $VF_3$

Figure 12:
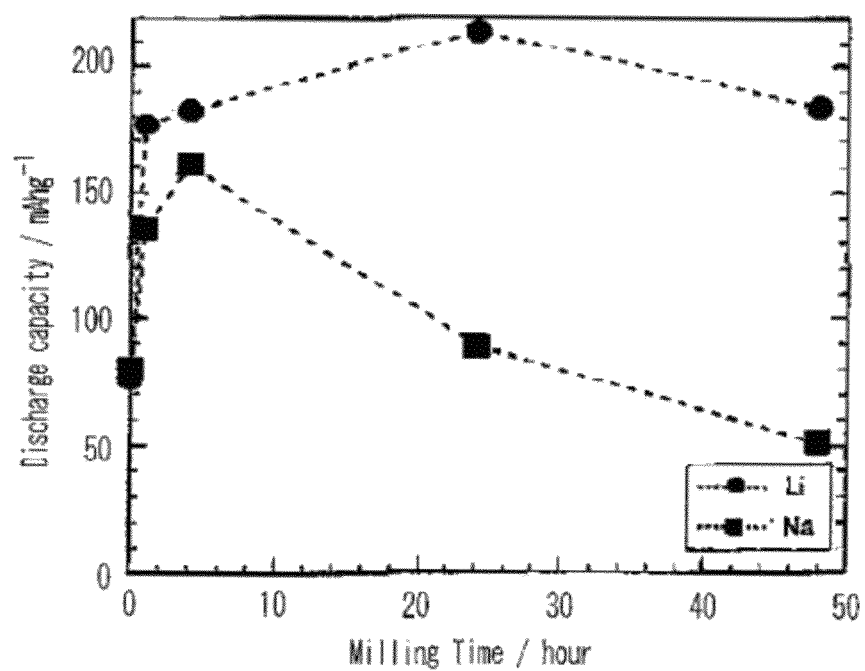
FIG. 12 is graphs showing a relationship between a ball milling time and a discharge capacity in a non-aqueous electrolyte secondary battery employing the cathode active material of the second embodiment.

In FIG. 12, a relationship is shown between the ball mill mixing time and the discharge capacity in the Li cell employing the above-described carbon-coated $VF_3$ as the cathode 1. Similarly, a relationship is shown between the ball mill mixing time and the discharge capacity in the Na cell employing the carbon-coated $VF_3$ as the cathode 1. In case of the Na cell, an extremely excellent result was obtained when the ball mill mixing time was 4 hours.

Figure 13:
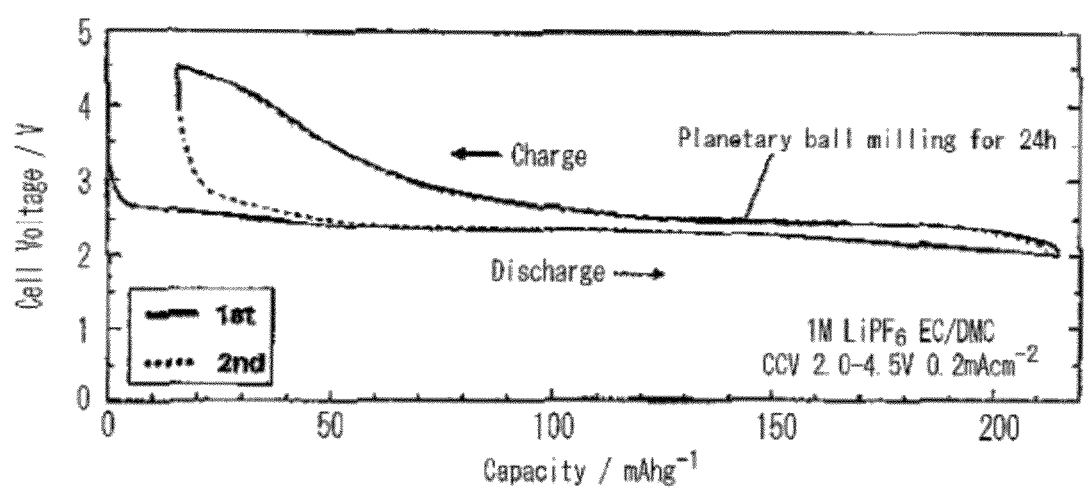
FIG. 13 is a graph showing profiles of charging and discharging of the Li cell employing the cathode active material according to the second embodiment.

In FIG. 13, a profile of charging and discharging in the Li cell employing the carbon-coated $VF_3$ as the cathode 1 is shown. In FIG. 13, a solid line represents a result of a first cycle and a dashed line represents a result of a second cycle. As shown in FIG. 13, this Li cell has a reversible capacity of 200 mAh/g or more. Additionally, it can be understood that a difference between a cell voltage in charging and that in discharging is extremely small and the cell is extremely efficient.

Figure 14:
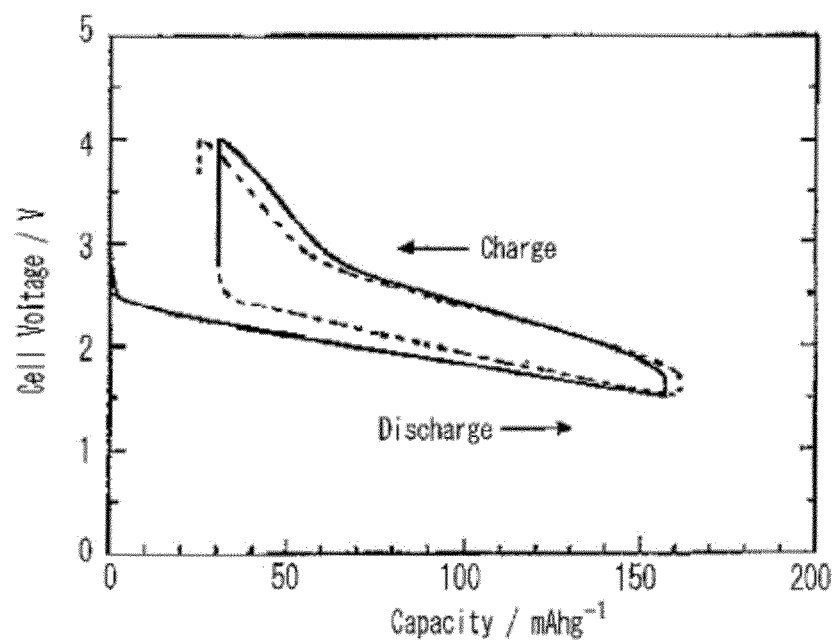
FIG. 14 is a graph showing profiles of charging and discharging of the Na cell employing the cathode active material according to the second embodiment.

Similarly, FIG. 14 shows a profile of charging and discharging in the Na cell employing the carbon-coated $VF_3$ (the ball mill mixing time was 4 hours) as the cathode 1. In FIG. 14, a solid line represents a result of a first cycle and a dashed line represents a result of a second cycle. As described in relation to FIG. 12, an initial capacity of 160 mAh/g was obtained and a reversible capacity of 140 mAh/g was obtained by employing the carbon-coated $VF_3$ obtained in the 4-hour ball mill mixing time as the cathode active material. Thus, an excellent sodium cell can be accomplished.

EXAMPLE 6

Carbon-Coated $TiF_3$

Figure 15A:
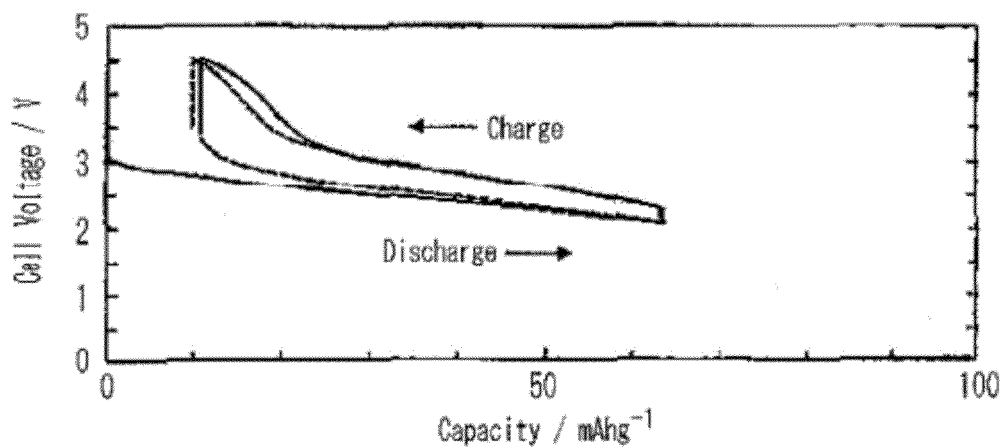
FIG. 15A is graphs showing of charge and discharge profiles of the non-aqueous electrolyte secondary battery employing the cathode active material of the second embodiment.
Figure 15B:
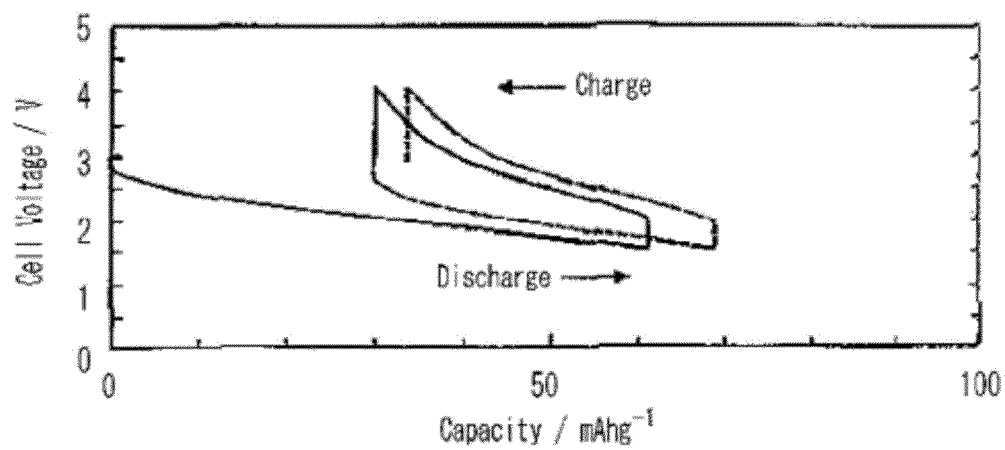
FIG. 15B is graphs showing charge and discharge profiles of the non-aqueous electrolyte secondary battery employing the cathode active material of the second embodiment.

FIG. 15A shows a profile of charging and discharging of the Li cell employing the above-described carbon-coated $TiF_2$ (the ball mill mixing time was 1 hours) as the cathode 1. In FIG. 15A, a solid line represents a result of a first cycle and a dashed line represents a result of a second cycle. FIG. 15B shows a profile of charging and discharging of a Na cell employing the above-described carbon-coated $TiF_3$ (the ball mill mixing time was 1 hours) as the cathode 1. In FIG. 15B, a solid line represents a result of a first cycle and a dashed line represents a result of a second cycle. Both of the Li cell and the Na cell have a moderately high reversible charge and discharge capacity. It is believed that a further high reversible capacity can be realized by using a suitable electrolytic solution.

The fluoride cathode obtained by the present invention can contribute development of a safe, high-capacity, and low-cost non-aqueous electrolyte secondary battery in combination with a carbon anode or the like.

The present invention realizes a high reversible charge and discharge capacity (energy density) in a non-aqueous electrolyte secondary battery including an inexpensive Na cell, and the cathode active material of the present invention is expected to be used for a cathode material of cells in various types of industrial fields, for example, a large power source for load leveling and a battery for electric vehicle both required to ensure economic efficiency, safety, and a capacity in parallel.

The invention claimed is:

1. A method of manufacturing a cathode active material for a non-aqueous electrolyte secondary battery comprising:
   providing alkaline metal fluoride which is expressed by a general formula AF (A indicates Na or Li) and a transition metal fluoride which is expressed by a formula $M'F_2$ and/or $M'F_3$ (M' indicates one transition element);
   executing a mechanical milling process to the alkaline metal fluoride and the transition metal fluoride to produce metal fluoride compound which is expressed by a formula $AM'F_3$ and/or a formula $AM'F_4$; and
   wherein, the transition element M' is one selected from the group consisting of V, Ti Fe, Ni, Co and Mn.

2. The method according to claim 1, wherein the mechanical milling process is executed by using a planetary ball mill.

3. The method according to claim 1, further comprising:
   coating the metal fluoride compound $AM'F_3$ and/or $AM'F_4$ with carbon.

4. The method according to claim 3, wherein said coating comprises: mechanically pulverizing and mixing the metal fluoride compound $AM'F_3$ and/or $AM'F_4$ and carbonaceous material in a dry process under an inert gas atmosphere.

* * * * *